Dec. 15, 1925.　　　　J. A. BRIED　　　　1,565,545
VELOCIPEDE
Filed June 3, 1922
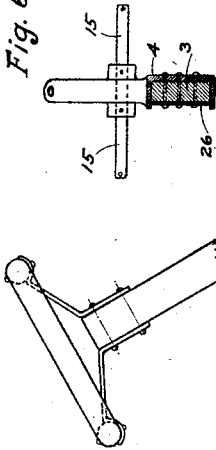
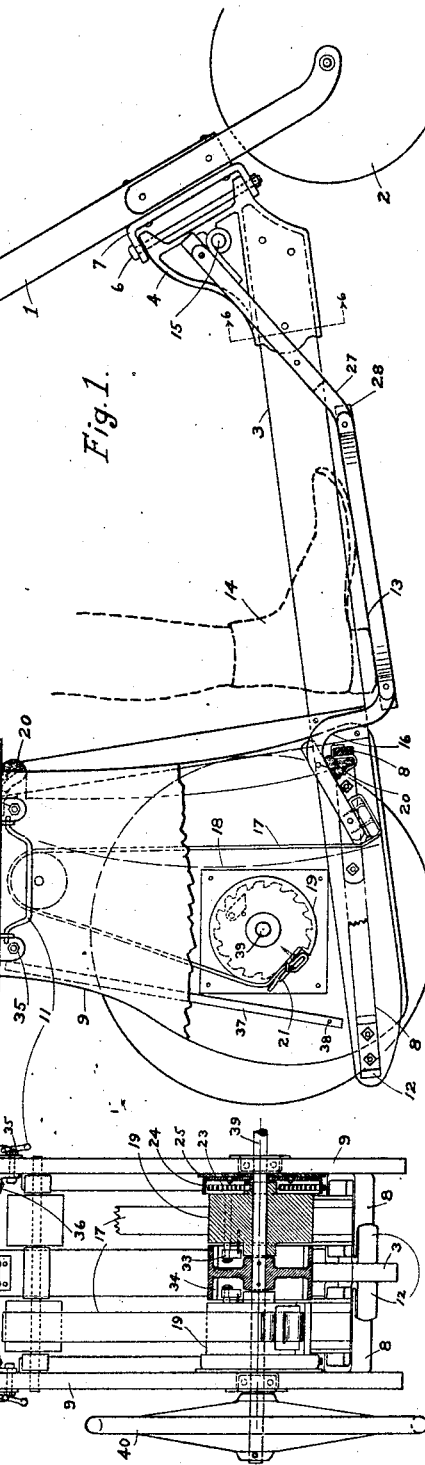
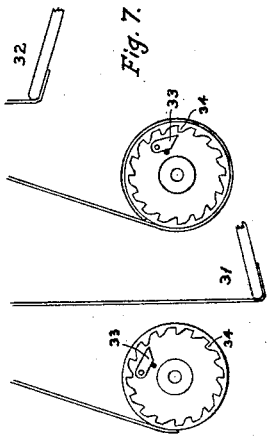
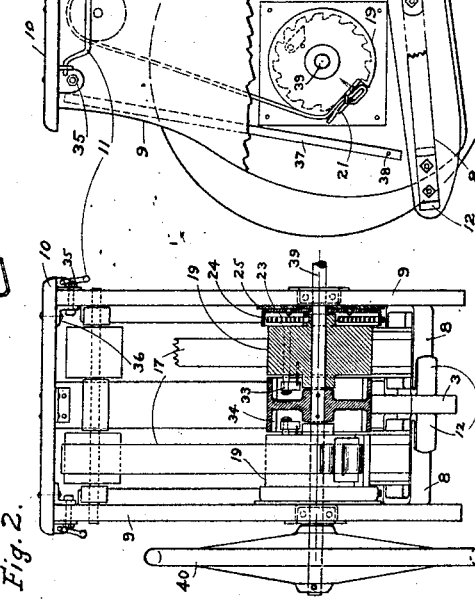
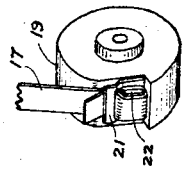
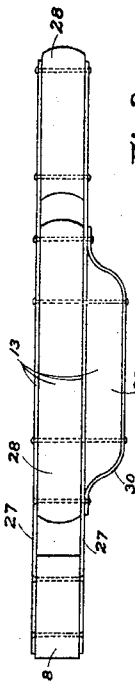
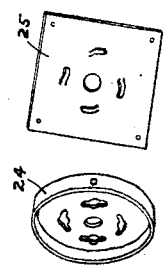
INVENTOR.
Julien A. Bried.

Patented Dec. 15, 1925.

1,565,545

UNITED STATES PATENT OFFICE.

JULIEN A. BRIED, OF OAKLAND, CALIFORNIA, ASSIGNOR TO H. C. WHITE COMPANY, OF NORTH BENNINGTON, VERMONT, A CORPORATION OF VERMONT.

VELOCIPEDE.

Application filed June 3, 1922. Serial No. 565,595.

*To all whom it may concern:*

Be it known that I, JULIEN A. BRIED, a citizen of the United States, residing at Oakland, in the county of Alameda and State of California, have invented new and useful Improvements in a Velocipede, of which the following is a specification, and which is illustrated in the accompanying drawings.

This invention relates to velocipedes of the class carrying the rider on oscilating treadles in a standing position and it has for its objects a general perfection of such a vehicle as shown in my patent of March 5, 1918, No. 1,258,391 contributing to better riding qualities and simplified construction.

I attain the above objects by the construction shown in the accompanying drawings in which Figure 1 is an elevation of my velocipede of the three wheel type with the near body side and near rear wheel partially removed.

Figure 2 is a view of the rear end of the vehicle.

Figure 3 is a plan view of one treadle,

Figure 4 is a perspective sketch of the spring tensioning plates.

Figure 5, the belt connecting buckle on a driving spool, shown in perspective.

Figure 6, a section of the reach member showing how it is secured to the steering head.

Figure 7, diagrams to illustrate the pawl and ratchet action.

In more detailed reference to the drawings, Figure 1 gives a general idea of the elevation of my velocipede as improved. The steering post 1 carrying a front wheel 2 is connected to the rear body portion by the centrally located reach piece 3 through the agency of a bracket or steering head 4 secured to the forward end of the reach and pivoted by a bolt 6 to a bracket 7 on the steering post, and at the rear end a frame 8, in two pieces, bolted to the sides of the reach and riveted to the sides 9 of the body. A driving axle 39 passes through bearings in the sides, and carries the rear wheels 40 (one only being shown).

The body has a top 10 bolted to the sides, which serves as a seat for the rider in "coasting" or for an extra passenger facing backward. Handles 11 are provided for this passenger as well as a foot rest 12 formed out of the frames 8 by having the ends bent outward. At 37 is a door pivoted to the sides at 38.

At 13 is shown a treadle, of which there are two, both presumed to be down to the lowest point on account of a rider standing on them as indicated at 14.

The treadles are pivoted at their forward ends to a short transverse shaft 15 carried by the bracket 4 and have a depressed portion for the feet of the rider and a rearwardly extending offset portion 16 straddling the frame 8 and connected at the extreme rear end to driving belts 17.

The treadles are adapted to oscillate in the arc as dotted at 18 to transmit power through spring actuated return ratchet spools 19 which lift the treadles, all as described in my previous patent referred to.

By depressing the treadles and straddling the rear frame with them as shown, I secure a longer stroke, carry the rider closer to the ground, yet maintain a better road clearance for the body.

At 20 at both ends of the treadle stroke are arranged felt shock absorbers to reduce the noise otherwise developed.

The belts 17 are each respectively secured to one of the driving ratchet spools 19 through a buckle 21 and a keeper therein 22. This permits taking up any stretch to maintain certain neutral zones hereinafter mentioned.

The spiral springs 23 indicated in Figure 2 have one end inserted in the hub of the spools 19 and the outer end hooked in a hole in the rim of a spring winding disc 24. This disc has several keyholes for engaging tongues in a locking plate 25 secured to the sides of the vehicle body, and by turning the disc and hooking into the plate the spring tension may be adjusted to suit.

By referring to the perspective sketches in Figure 4, the construction of these members will be readily understood.

The method of securing the reach member 3 to the front bracket 4 is shown in cross section in Figure 6. It will be observed that the bracket is made with an open pocket to receive the reach which latter is riveted to it, a filler plate 26 being placed on the exposed side of the reach.

The treadle construction is best shown in the plan of one of the treadles, Figure 3, wherein it will be seen to consist of longitudinal metal strap members 27 running clear through the treadle from end to end and bent edgewise to form the contour seen in Figure 1. These straps are riveted together against spacing blocks 28, and at 29 is an additional block to widen the treadle for the foot position. A short strap 30 surrounds this outer block and receives the same rivets passing through the other straps.

The pawl and ratchet construction is essentially the same as in my original patent mentioned, the pawls being gravity actuated. It will be noted by reference to said patent that the pawls fell out of mesh at the lowest point of the treadle strokes for coasting and were always engaged at the upper end or beginning of the stroke.

I have found that it is of considerable importance to have the pawls also in disengaged position at the very beginning of the stroke as well as at the end of the stroke. This permits the vehicle to be "backed up" or rolled backward by a child without the former necessity of locking down the treadles to obtain a disengaged drive and therefore a free running vehicle. This feature shown clearly in Figure 7 loses a little of the effective stroke as the treadles must be pushed down slightly to bring the pawls to engaging position but the advantage more than compensates this loss. It is accomplished by a proper proportioning of the driving spool in relation to the treadle stroke to produce the neutral zone at both ends of the stroke.

Figure 7 is diagrammatic and shows at 31 a treadle at lower end of stroke and at 32 a treadle at upper end of stroke with the pawl 33 disengaged from the ratchet 34 in both positions.

In the construction of the body of the vehicle, the sides 9 are laterally removable, being bolted along the upper edge at 35 to an angle iron 36 riveted to the seat, and at the bottom coming away each with a half of the frame 8 to which it is riveted, upon unbolting the frames 8 from the reach piece 3.

Having thus described my improved velocipede,

I claim:

1. In a vehicle of the character described, a steering post carrying a front wheel, a body carrying an axle and two rear wheels, a centrally disposed reach member connecting the steering post and body, said reach member being of oblong cross section with its longer cross dimension disposed in a vertical plane and passing rearwardly under the axle, lateral framing secured to the rearward portion of the reach member and to the sides of the body, a pair of operating treadles pivotally supported at their forward ends by the reach member and extending rearwardly along the sides of said member with their rearward ends projecting over said framing into said body and adapted to oscillate therein.

2. In a velocipede of the character described embracing a steering post and a rear axle, a single central reach frame member only, said member being a substantially straight bar pivotally connected at its forward end to the steering post and extending straight rearwardly under the rear axle and laterally connected to support the same, and a pair of longitudinally disposed operating treadles pivotally supported at their forward ends to the forward end of the bar for oscillation along opposite sides thereof, and with the rear ends of the treadles operatively connected to revolve the rear axle.

3. In a vehicle of the class described, an operating treadle pivoted to oscillate in a vertical plane, means limiting the length of the oscillation, and a piece of felt interposed between said means and the treadle, said felt being doubled over on itself and the double portion arranged to take the impact.

4. In a vehicle of the class described having a housing secured to a lower frame, a pair of operating treadles adapted to oscillate at one end within the housing between the top thereof and the frame, bumpers arranged under the top of the housing and on the frame to receive the impact of the treadles, the latter bumpers comprising each a holder supported on the frame with a piece of folded over felt therein, the folded portion being arranged to take the impact.

5. In a vehicle of the class described embracing a steering post carrying a front wheel, and a body carrying rear wheels, a centrally located reach frame member connecting said steering post with said body, said reach member being a straight piece in plan, of oblong cross section vertically disposed, a bracket secured to the forward end of said member and pivoted to the steering post, said bracket having a pocket centrally disposed with the vehicle open on one side only to receive the forward end of the said member and being clamped thereto.

6. A vehicle of the class described embracing a steering post, a longitudinal central frame member pivoted to same and extending rearwardly, lateral framing at the rear of said member, a pair of operating treadles arranged to oscillate along the sides of said member, the rear ends of said treadles being offset to straddle said lateral framing.

7. In a velocipede of the character described, an elongated operating treadle extending longitudinally of the vehicle and pivoted transversely thereto at its forward end, said treadle having a foot receiving shelf and being turned upwardly at the rear of the foot shelf whereby it functions as a rear stop for a rider's heel, and the treadle then extending rearwardly and being connected at its rear end for propulsion of the vehicle.

8. In a vehicle of the class described, foot treadle operated driving mechanism embracing a gravity actuated pawl, said pawl being in disengaged position at the upper end of the treadle stroke.

9. In a vehicle of the class described, foot treadle operated driving mechanism embracing a gravity actuated pawl, said pawl being in disengaged position at the beginning and at the end of the stroke.

10. In a vehicle of the class described, operating treadles, belts attached to said treadles and to spring return rotary ratchet devices, spiral actuating springs each secured at one end to one of the said devices, and at the other end each to an adjusting member for varying the tension of said springs.

11. In a vehicle of the class described having a rear axle and a pair of rear wheels, a body over the axle having two sides, a central main frame reach member passing between the wheels under the axle, framing extending laterally from the lower part of the sides and secured to the reach member.

12. In a vehicle of the class described having oscillatory operating treadles, a reach member, a box body embracing two sides, framing connecting said sides to said reach member, said framing being fashioned at its rearward end as a foot rest for a passenger sitting on said vehicle.

13. In a vehicle of the class described having rear wheels and transmission mechanism, a box form body at the rear end of the vehicle supporting the rear wheels and housing the transmission mechanism, said body having a flat top serving as a seat and a pair of handles at the sides of and entirely below the upper level of the top.

14. In a vehicle of the class described having rear wheels and transmission mechanism, a box form body at the rear end of the vehicle supporting the rear wheels and housing the transmission mechanism, said body having sides and a flat top overhanging the sides, and handles secured to the sides under the overhanging top.

15. In a vehicle of the class described having rear wheels and transmission mechanism, a box form body at the rear end of the vehicle supporting the rear wheels and housing the transmission mechanism, said body having sides and a flat top overhanging the sides, and hand grips arranged against the sides under the overhanging top, and a foot rest projecting from the rear of the body.

16. In a vehicle of the class described having oscillatory operating treadles, a box body housing transmission elements, one of the sides of said box body being detachable for assembling said elements.

17. In a vehicle of the class described having oscillatory operating treadles, a box body having sides laterally removable from the vehicle.

18. In a vehicle of the class described, an oscillatory treadle, a belt connecting said treadle with a rotary device for transmitting power to a rear wheel, a device through which said belt passes for lengthening or shortening said belt.

19. In a vehicle of the class described, an oscillatory treadle, a belt connecting said treadle with a rotary device for transmitting power to a rear wheel and means for adjusting the length of said belt.

20. In a treadle operated vehicle of the class described having front and rear wheels, a treadle embracing two metal straps bent edgewise to the elevation of the treadle and spacing blocks riveted between said straps.

21. In a treadle operated vehicle of the class described having front and rear wheels, a treadle embracing two metal straps bent edgewise to the elevation of the treadle and spacing blocks riveted between said straps and an auxiliary block outside of one of said straps and riveted thereto to form a widened foot support.

22. In a treadle operated vehicle of the class described having front and rear wheels, a treadle with a depressed foot supporting portion and a metal strap on both sides of said treadle.

JULIEN A. BRIED.